(12) United States Patent
Leppänen et al.

(10) Patent No.: US 10,437,874 B2
(45) Date of Patent: Oct. 8, 2019

(54) SEARCHING IMAGE CONTENT

(71) Applicant: Nokia Technologies Oy, Espoo (FI)

(72) Inventors: Jussi Leppänen, Tampere (FI); Francesco Cricri, Tampere (FI); Antti Eronen, Tampere (FI); Arto Lehtiniemi, Lempäälä (FI)

(73) Assignee: Nokia Technologies Oy, Espoo (FI)

(*) Notice: Subject to any disclaimer, the term of this patent is extended or adjusted under 35 U.S.C. 154(b) by 59 days.

(21) Appl. No.: 15/750,292

(22) PCT Filed: Aug. 10, 2016

(86) PCT No.: PCT/FI2016/050559
§ 371 (c)(1),
(2) Date: Feb. 5, 2018

(87) PCT Pub. No.: WO2017/025663
PCT Pub. Date: Feb. 16, 2017

(65) Prior Publication Data
US 2018/0225290 A1 Aug. 9, 2018

(30) Foreign Application Priority Data
Aug. 13, 2015 (EP) ..................................... 15181004

(51) Int. Cl.
*G06F 16/432* (2019.01)
*G06T 19/00* (2011.01)
(Continued)

(52) U.S. Cl.
CPC ............ *G06F 16/434* (2019.01); *G06F 16/48* (2019.01); *G06F 16/54* (2019.01);
(Continued)

(58) Field of Classification Search
CPC ............................ G06T 19/006; G06F 16/434
See application file for complete search history.

(56) References Cited

U.S. PATENT DOCUMENTS 8,910,201 B1 * 12/2014 Zamiska .......... H04N 21/44222
725/34
10,083,542 B1 * 9/2018 Murao .................... G06T 17/00
(Continued)

FOREIGN PATENT DOCUMENTS

EP 3112986 A1 1/2017

OTHER PUBLICATIONS

"How to Remove Anything from a Photo in Photoshop", YouTube, Retrieved on Jan. 25, 2018, Webpage available at : https://www.youtube.com/watch?v=ifhEx4adAa8.
(Continued)

*Primary Examiner* — Phi Hoang
(74) *Attorney, Agent, or Firm* — Nokia Technologies Oy

(57) ABSTRACT

A method, an apparatus and computer program code is provided. The method comprises: responding to user input by making at least one alteration to a recording of a real scene in a first image content item; determining at least one altered characteristic of the recording of the real scene; determining whether one or more further image content items, different from the first image content item, have a recording of a real scene comprising the at least one determined altered characteristic; and causing at least one further image content item, having a recording of a real scene comprising the at least one determined altered characteristic, to be indicated to a user.

20 Claims, 11 Drawing Sheets

(51) Int. Cl.
*G06F 16/54* (2019.01)
*G06F 16/583* (2019.01)
*G06F 16/58* (2019.01)
*G06F 16/48* (2019.01)
*G11B 27/034* (2006.01)
*G11B 27/34* (2006.01)

(52) U.S. Cl.
CPC ...... *G06F 16/5838* (2019.01); *G06F 16/5866* (2019.01); *G06T 19/006* (2013.01); *G11B 27/034* (2013.01); *G11B 27/34* (2013.01)

(56) References Cited

U.S. PATENT DOCUMENTS

| | | | |
|---|---|---|---|
| 2010/0128121 A1* | 5/2010 | Wilkinson | H04N 5/272 348/135 |
| 2010/0289817 A1* | 11/2010 | Meier | G06T 15/20 345/619 |
| 2011/0096093 A1* | 4/2011 | Oi | G06T 19/006 345/633 |
| 2013/0093759 A1 | 4/2013 | Bailey | |
| 2013/0201216 A1 | 8/2013 | Nakamura et al. | |
| 2014/0082491 A1* | 3/2014 | Adachi | G06F 3/0488 715/702 |
| 2014/0160001 A1 | 6/2014 | Kinnebrew et al. | |
| 2014/0176530 A1* | 6/2014 | Pathre | G06T 19/20 345/419 |
| 2014/0380216 A1 | 12/2014 | Beaurepaire | |
| 2016/0148433 A1* | 5/2016 | Petrovskaya | G06T 19/006 345/633 |
| 2017/0193331 A1* | 7/2017 | La Fleur | G06T 7/55 |

OTHER PUBLICATIONS

"Famous Faces Morphing", YouTube, Retrieved on Jan. 25, 2018, Webpage available at : https://www.youtube.com/watch?v=wZurRt0Tidl.

"Video tracking", Wikipedia, Retrieved on Jan. 25, 2018, Webpage available at : https://en.wikipedia.org/wiki/Video_tracking.

Extended European Search Report received for corresponding European Patent Application No. 15181004.1, dated Feb. 9, 2016, 5 pages.

International Search Report and Written Opinion received for corresponding Patent Cooperation Treaty Application No. PCT/FI2016/050559, dated Nov. 3, 2016, 12 pages.

\* cited by examiner

SEARCHING IMAGE CONTENT

RELATED APPLICATION

This application was originally filed as Patent Cooperation Treaty Application No. PCT/FI2016/050559 filed Aug. 10, 2016 which claims priority benefit to European Patent Application No. 15181004.1, filed Aug. 13, 2015.

TECHNOLOGICAL FIELD

Embodiments of the present invention relate to searching through image content. In particular, they relate to searching through image content items using an altered characteristic of a recording of a real scene.

BACKGROUND

Image content items, such as static images and motion video, may be captured by a camera. Such image content items may be displayed by a device. The device may enable the user to browse through the image content items.

BRIEF SUMMARY

According to various, but not necessarily all, embodiments of the invention there is provided a method, comprising: responding to user input by making at least one alteration to a recording of a real scene in a first image content item; determining at least one altered characteristic of the recording of the real scene; determining that one or more further image content items, different from the first image content item, have a recording of a real scene comprising the at least one determined altered characteristic; and causing at least one further image content item, having a recording of a real scene comprising the at least one determined altered characteristic, to be indicated to a user.

According to various, but not necessarily all, embodiments of the invention there is provided computer program code that, when performed by at least one processor, causes the following to be performed: responding to user input by making at least one alteration to a recording of a real scene in a first image content item; determining at least one altered characteristic of the recording of the real scene; determining that one or more further image content items, different from the first image content item, have a recording of a real scene comprising the at least one determined altered characteristic; and causing at least one further image content item, having a recording of a real scene comprising the at least one determined altered characteristic, to be indicated to a user.

One or more computer programs may comprise the computer program code. The one or more computer programs may be stored on one or more non-transitory computer readable mediums.

According to various, but not necessarily all, embodiments of the invention there is provided an apparatus, comprising: means for responding to user input by making at least one alteration to a recording of a real scene in a first image content item; means for determining at least one altered characteristic of the recording of the real scene; means for determining that one or more further image content items, different from the first image content item, have a recording of a real scene comprising the at least one determined altered characteristic; and means for causing at least one further image content item, having a recording of a real scene comprising the at least one determined altered characteristic, to be indicated to a user.

According to various, but not necessarily all, embodiments of the invention there is provided an apparatus, comprising: at least one processor; and memory comprising computer program code configured to, with the at least one processor, cause at least the following to be performed: responding to user input by making at least one alteration to a recording of a real scene in a first image content item; determining at least one altered characteristic of the recording of the real scene; determining that one or more further image content items, different from the first image content item, have a recording of a real scene comprising the at least one determined altered characteristic; and causing at least one further image content item, having a recording of a real scene comprising the at least one determined altered characteristic, to be indicated to a user.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIGS. 1A-1C and 2A-2C illustrate examples of mediated reality in which FIGS. 1A, 1B, 1C illustrate the same virtual space and different points of view and FIGS. 2A, 2B, 2C illustrate a virtual scene from the perspective of the respective points of view;

Figure 4A:
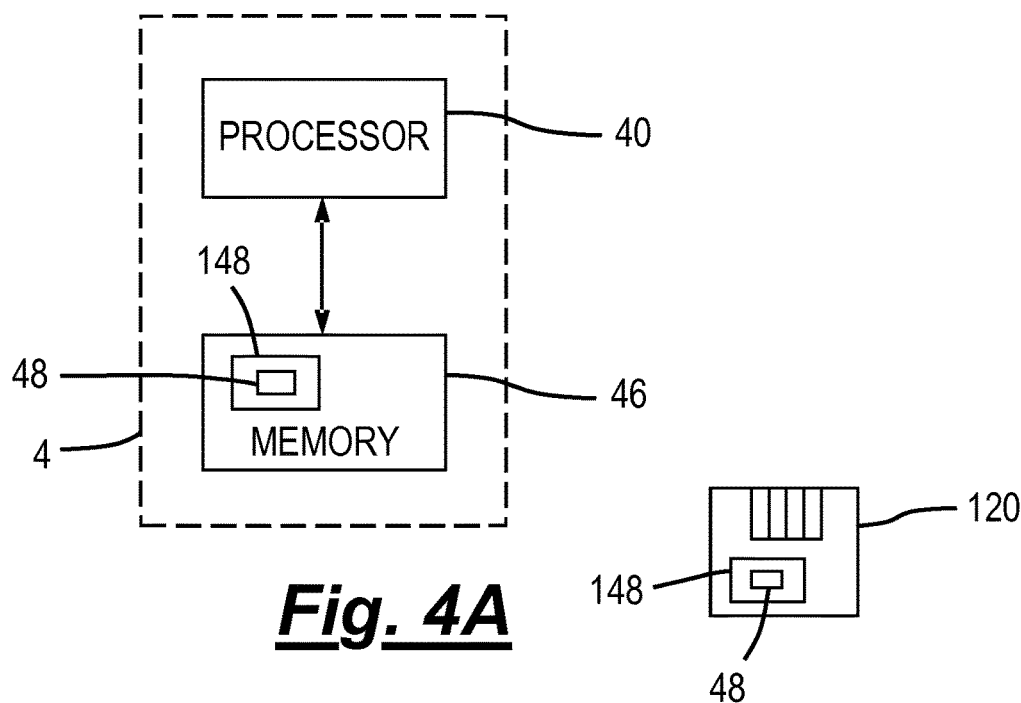
Figure 4B:
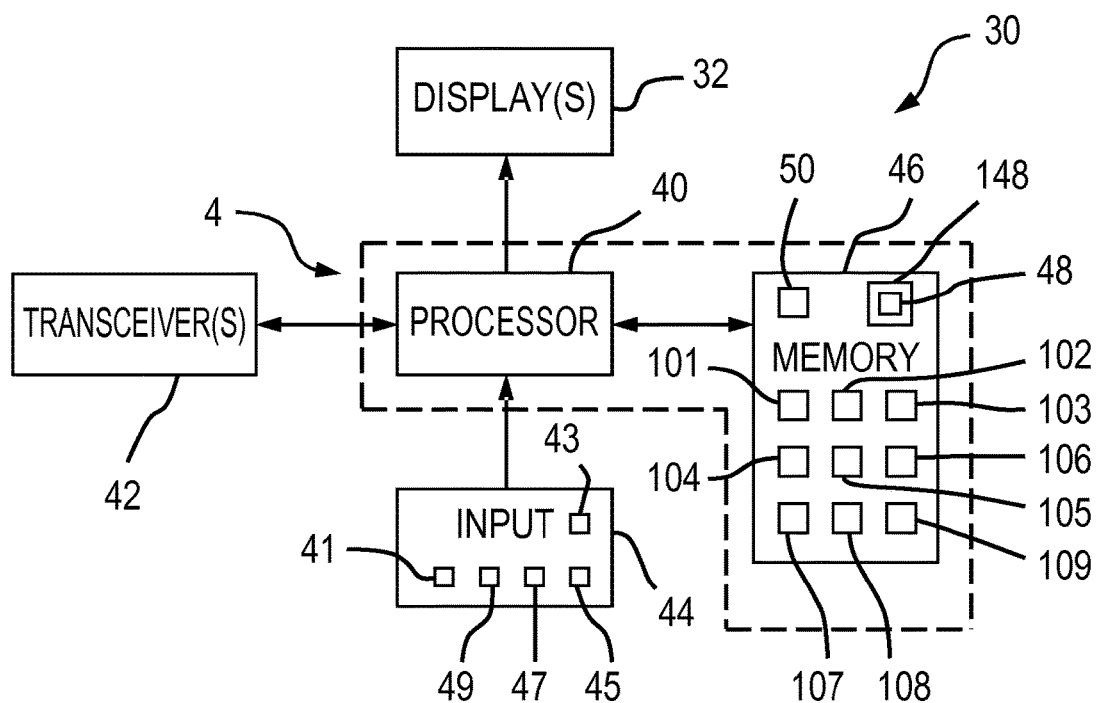
Figure 5:
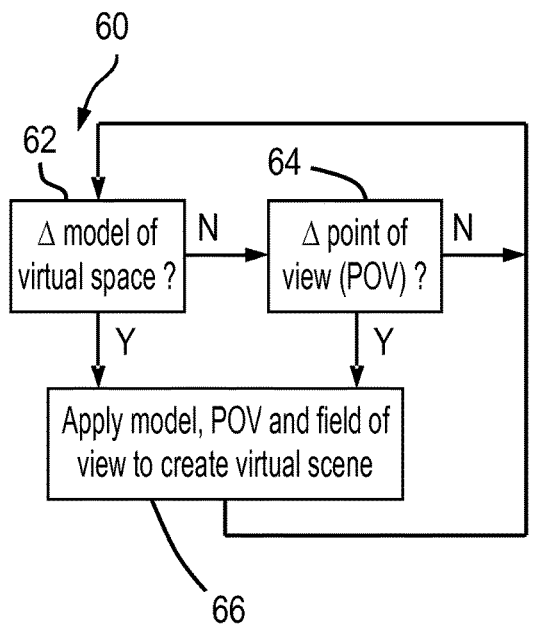
Figure 6:
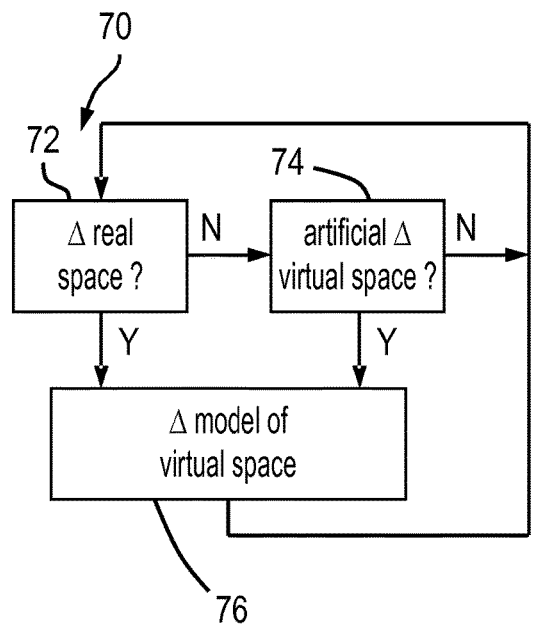
Figure 7A:
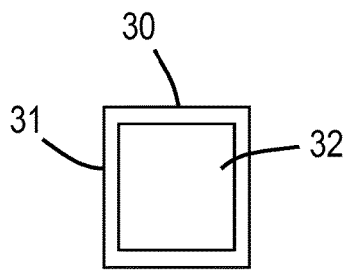
Figure 7B:
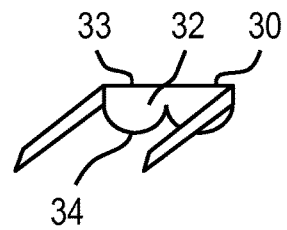
Figure 8:
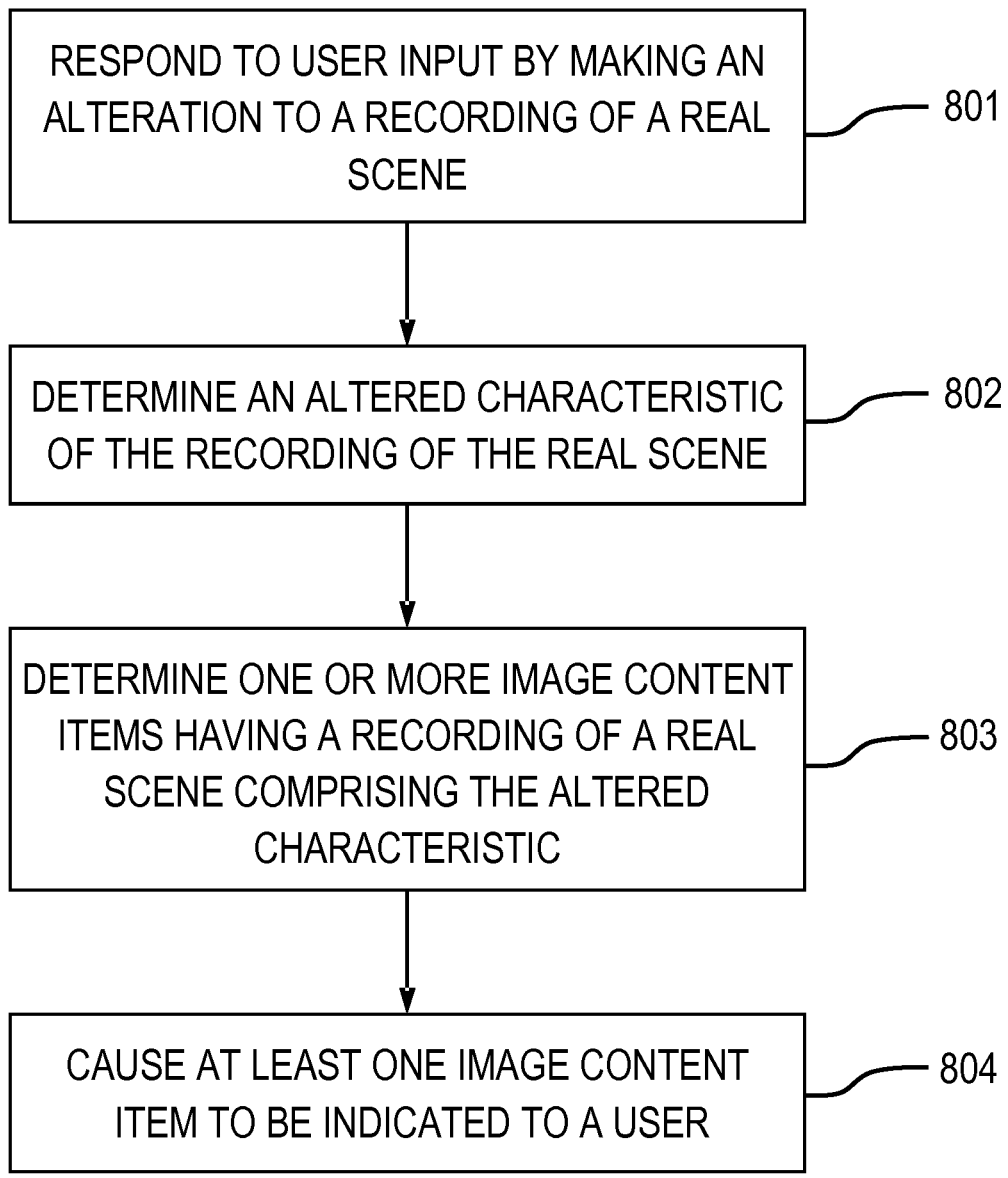
Figure 9:
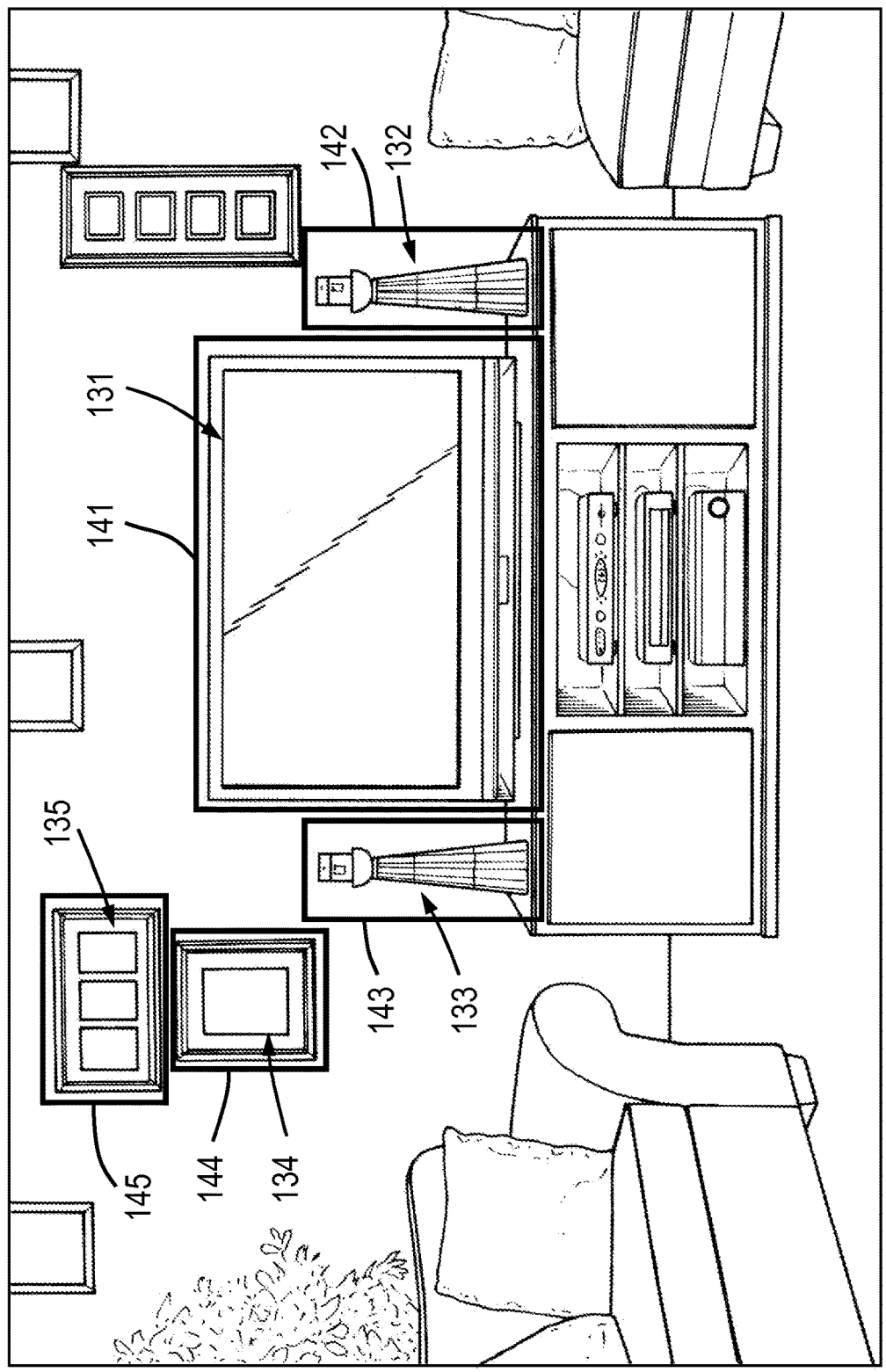
Figure 10:
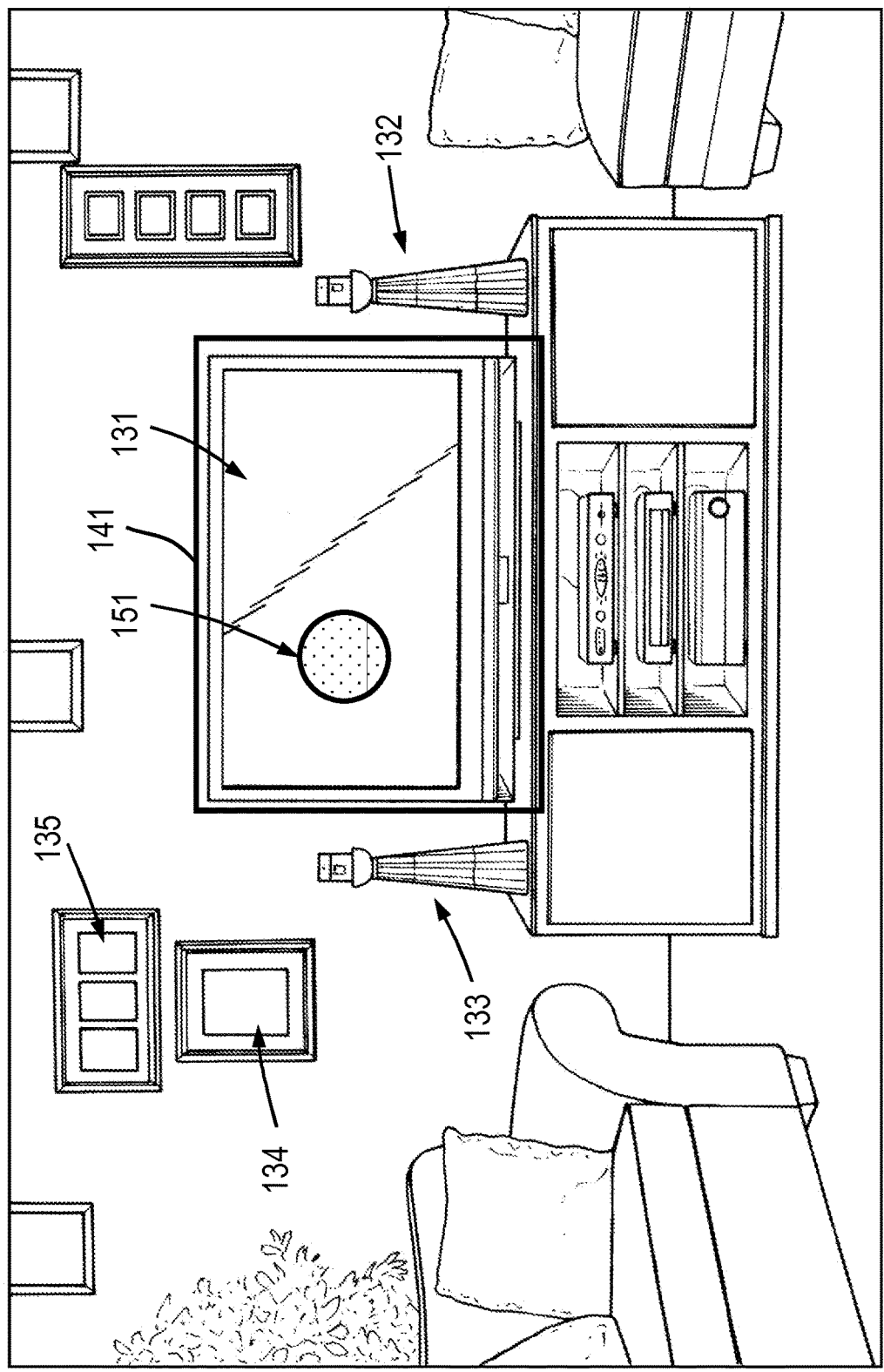
Figure 11:
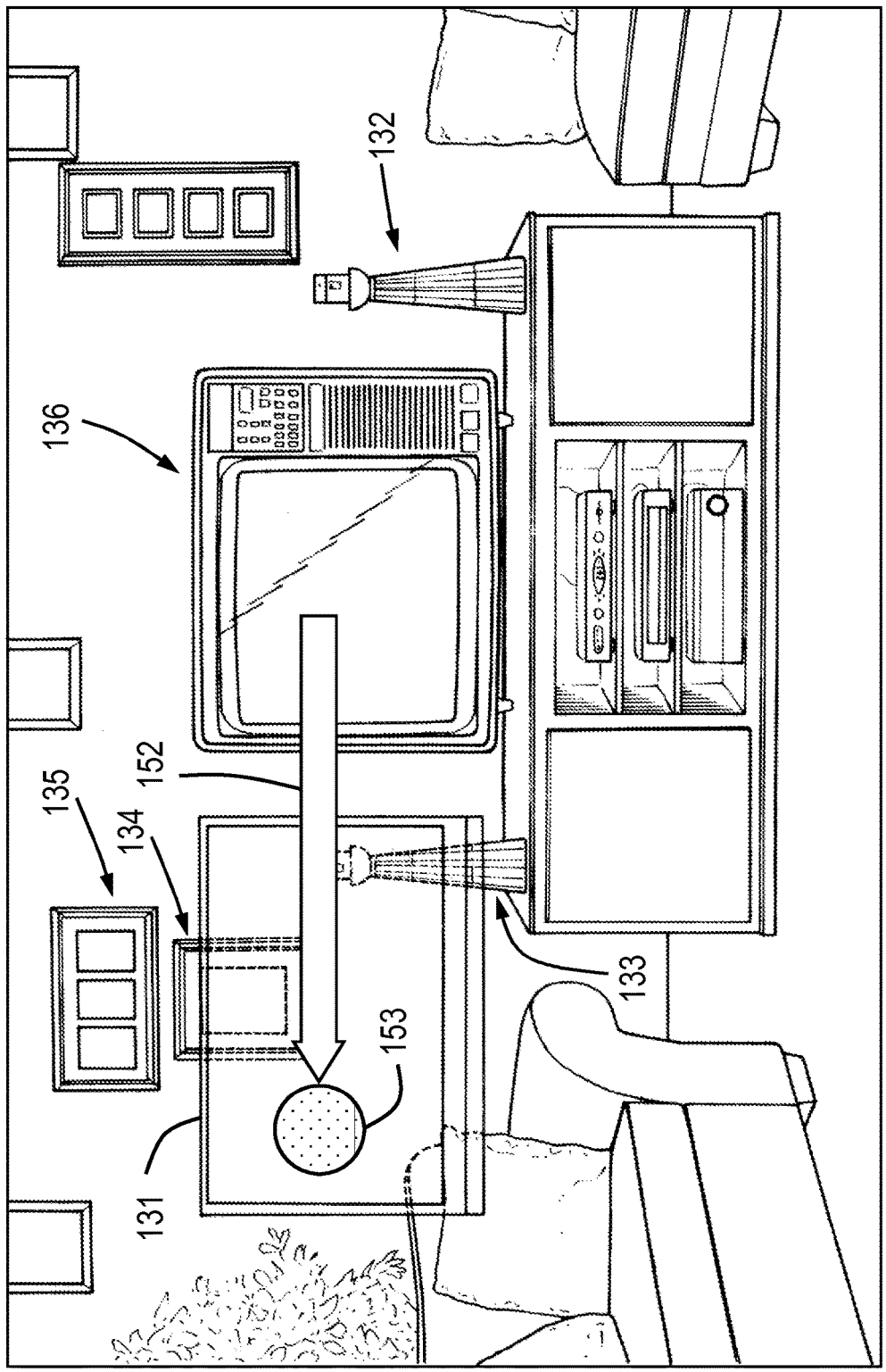
Figure 12:
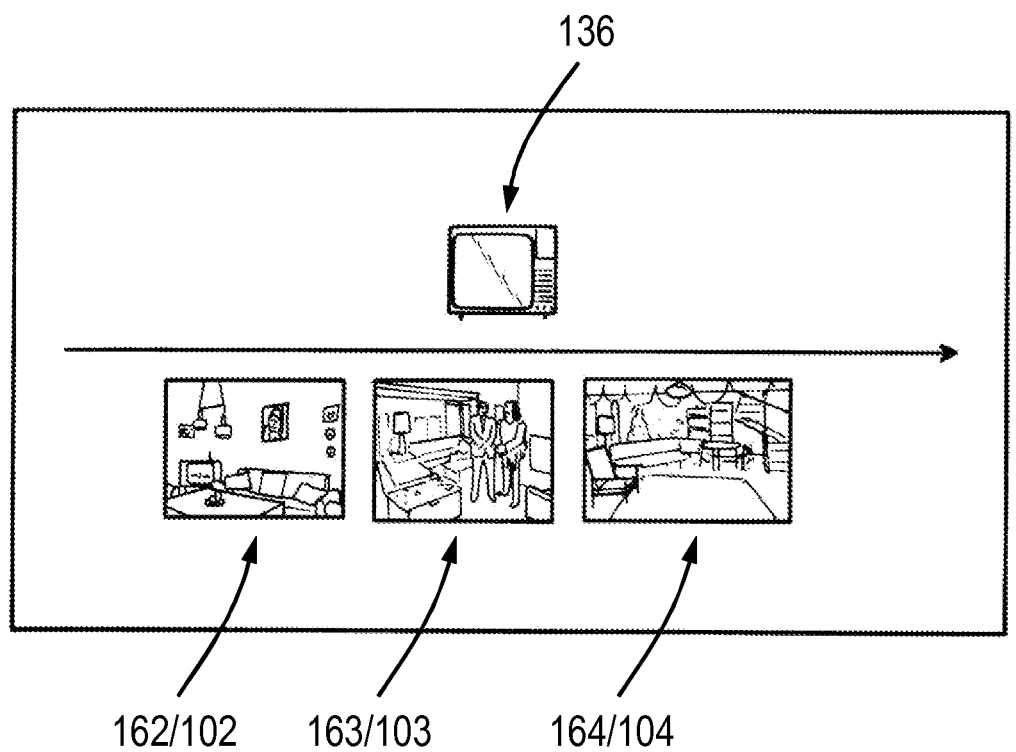
Figure 13:
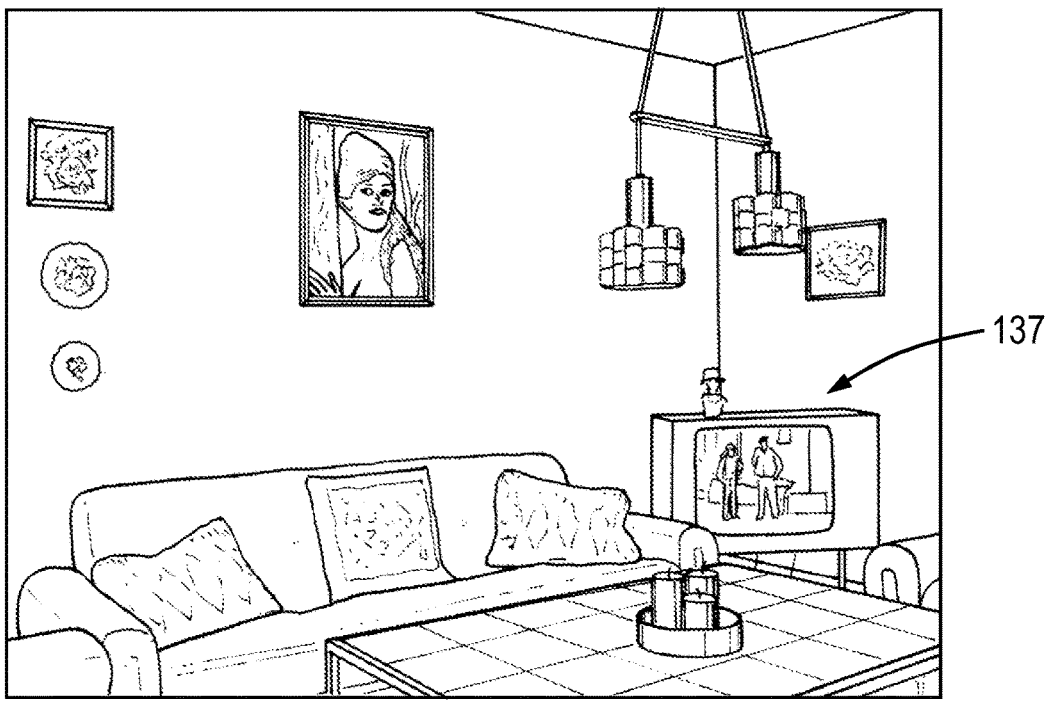
Figure 14:
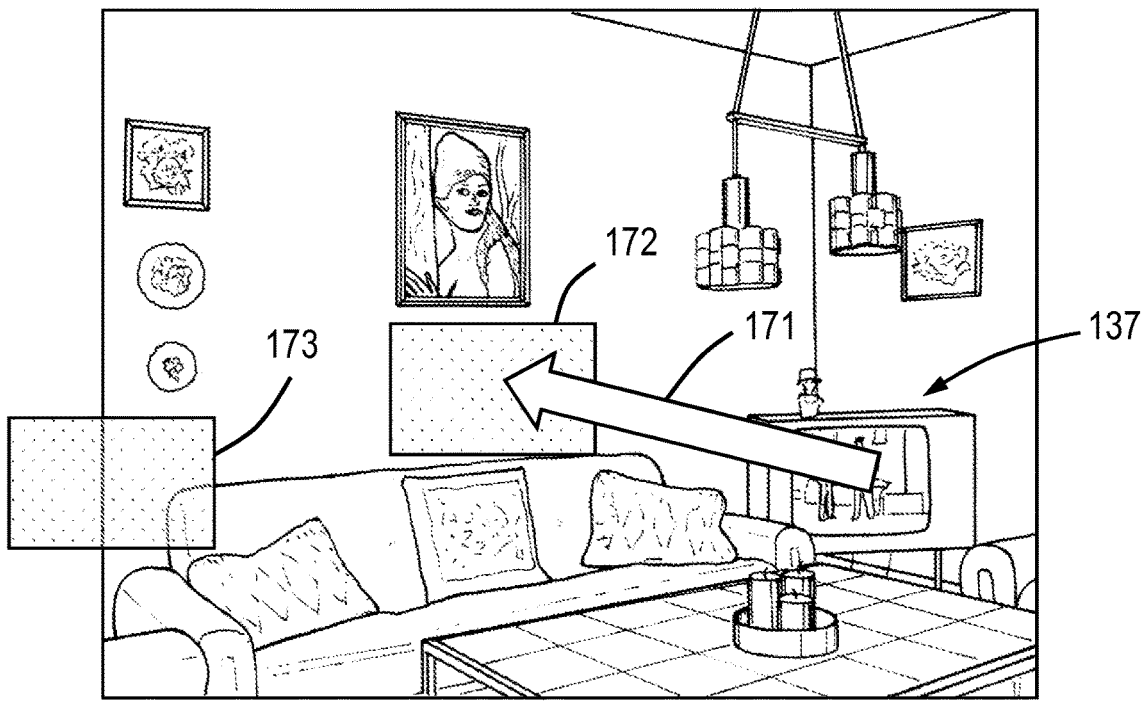
Figure 15:
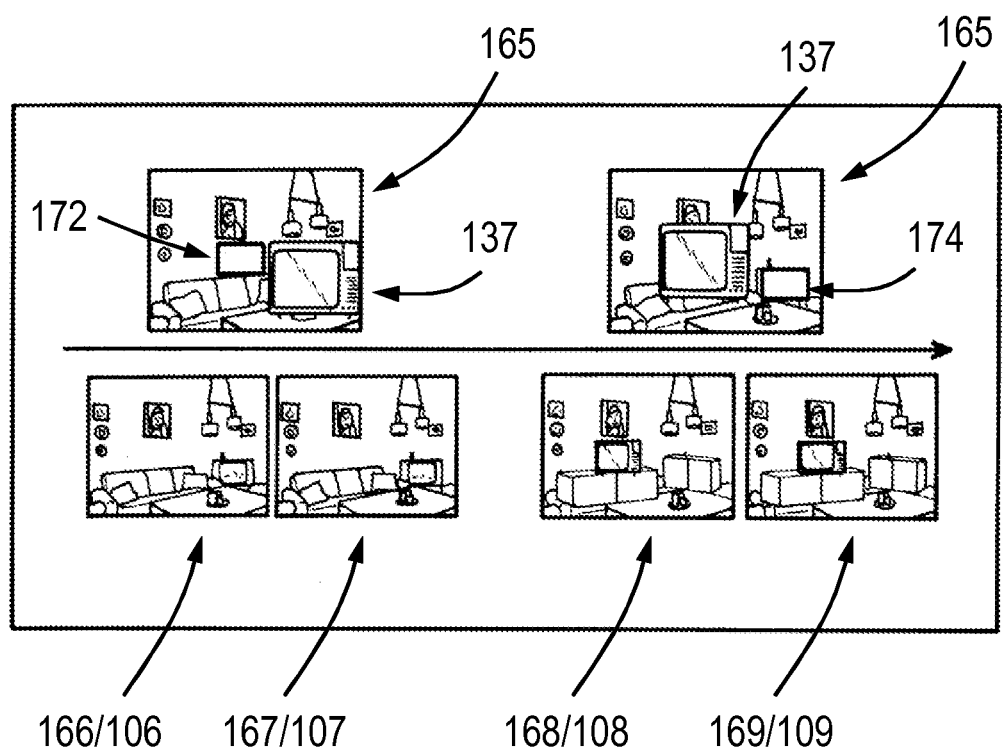

FIG. 4A a schematic of an apparatus in the form of a chip or chipset;

FIG. 4B illustrates a schematic of an apparatus in the form of one or more electronic devices that are operable to enable mediated reality and/or augmented reality and/or virtual reality;

FIG. 5 illustrates an example of a method for enabling mediated reality and/or augmented reality and/or virtual reality;

FIG. 6 illustrates an example of a method for updating a model of the virtual space for augmented reality;

FIGS. 7A and 7B illustrate an example of an apparatus that enables display of at least parts of the virtual scene to a user;

FIG. 8 illustrates a flow chart of a method;

FIG. 9 illustrates a recording of a real scene in a first image content item, where the recording includes images of real objects from the real scene;

FIG. 10 illustrates a user beginning a gesture while the recording of the real scene is displayed by the display;

FIG. 11 illustrates the user completing the gesture that he began in FIG. 10;

FIG. 12 illustrates second, third and fourth image content items being represented on a display after a search of image content items based on an altered characteristic of the recording of the real scene in the first image content item;

FIG. 13 illustrates a recording of a real scene in a fifth image content item;

FIG. 14 illustrates a user moving an image of a real object in the fifth image content item to one of a plurality of potential locations; and FIG. 15 illustrates sixth, seventh, eighth and ninth image content items being represented on a display after a search of image content items based on a location of an image of a real object in the fifth image content item.

DESCRIPTION

Embodiments of the invention relate to enabling a user to alter a recording of a real scene in an image content item, and then using the altered recording to search through and identify further image content items. For example, a user may alter a recording of a real scene by exchanging an image of a real object for an image of a different real object, alter a location of an image of a real object and/or alter a size of an image of a real object.

A technical effect of embodiments of the invention is an improved, more efficient way of searching though image content items that is intuitive to the user.

DEFINITIONS

In this document, the following definitions apply:

"field of view" refers to extent of the observable world that is visible to a user at a particular instance in time;

"virtual space" refers to fully or partially artificial environment, which may be three dimensional;

"virtual scene" refers to a representation of the virtual space viewed from a particular point of view within the virtual space;

"real space" refers to a real, tangible environment, which may be three dimensional;

"real scene" refers to a portion of the real space as viewed from a particular point of view within the real space;

"mediated reality" in this document refers to a user visually experiencing a fully or partially artificial environment (a virtual space) as a virtual scene at least partially displayed by a computer to a user. The virtual scene is determined by a point of view within the virtual space and a field of view. Displaying the virtual scene means providing it in a form that can be seen by the user;

"mediated reality content" is content which enables a user to visually experience a fully or partially artificial environment (a virtual space) as a virtual scene;

"augmented reality" in this document refers to a form of mediated reality in which a user visually experiences a partially artificial environment (a virtual space) as a virtual scene comprising a real scene of a physical real world environment (real space) supplemented by one or more visual elements displayed by an apparatus to a user;

"augmented reality content" is a form of mediated reality content which enables a user to visually experience a partially artificial environment (a virtual space) as a virtual scene;

"virtual reality" in this document refers to a form of mediated reality in which a user visually experiences a fully artificial environment (a virtual space) as a virtual scene displayed by an apparatus to a user;

"virtual reality content" is a form of mediated reality content which enables a user to visually experience a fully artificial environment (a virtual space) as a virtual scene;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view determines the point of view within the virtual space;

"user interactive-mediated" as applied to mediated reality, augmented reality or virtual reality means that user actions at least partially determine what happens within the virtual space; and "displaying" means providing in a form that is perceived visually by the user.

DETAILED DESCRIPTION

FIGS. 1A-1C and 2A-2C illustrate examples of mediated reality. The mediated reality may be augmented reality or virtual reality.

Figure 1A:
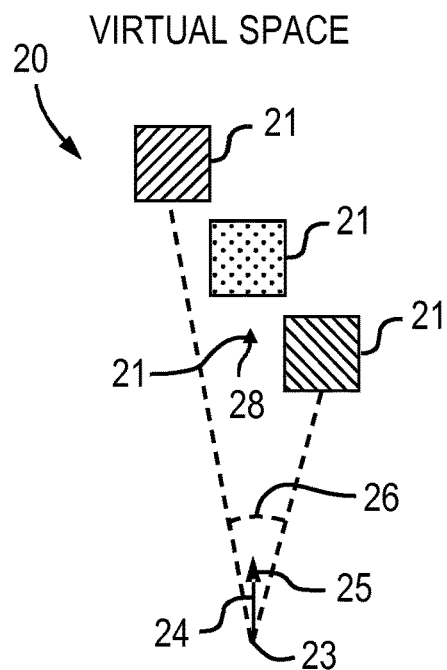
Figure 1B:
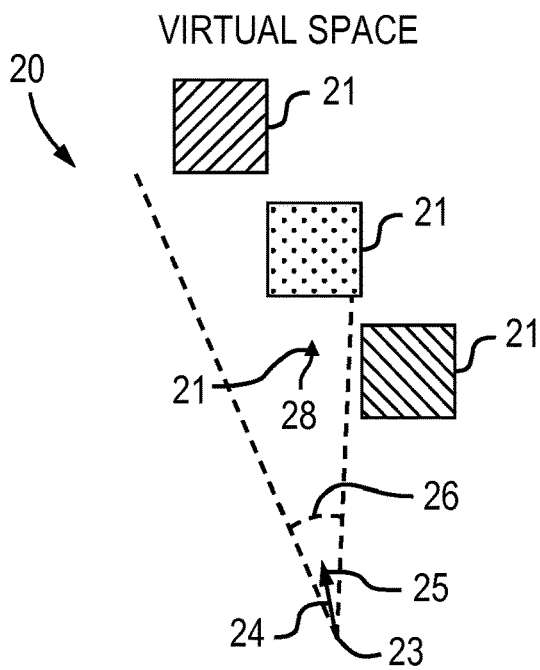
Figure 1C:
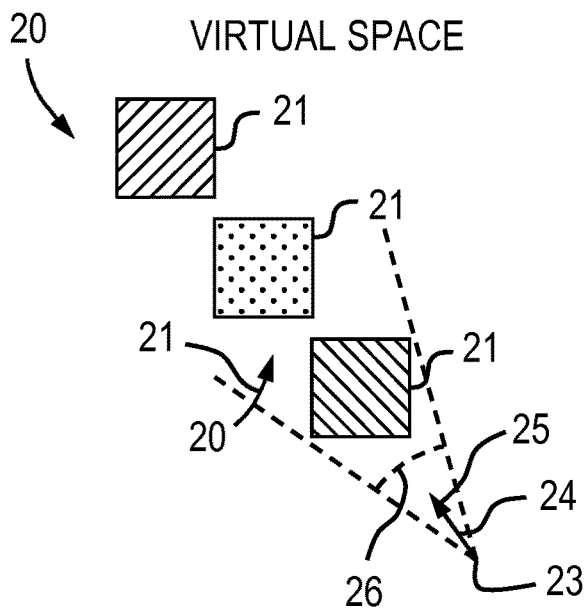

FIGS. 1A, 1B, 1C illustrate the same virtual space 20 comprising the same virtual objects 21, however, each figure illustrates a different point of view 24. The position and direction of a point of view 24 can change independently. The direction but not the position of the point of view 24 changes from FIG. 1A to FIG. 1B. The direction and the position of the point of view 24 changes from FIG. 1B to FIG. 1C.

Figure 2A:
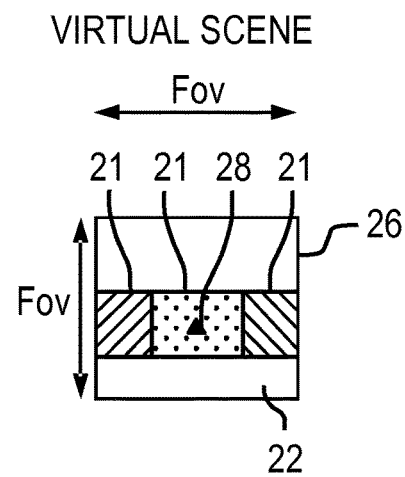
Figure 2B:
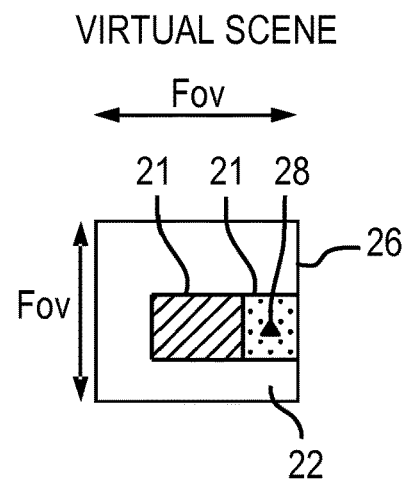
Figure 2C:
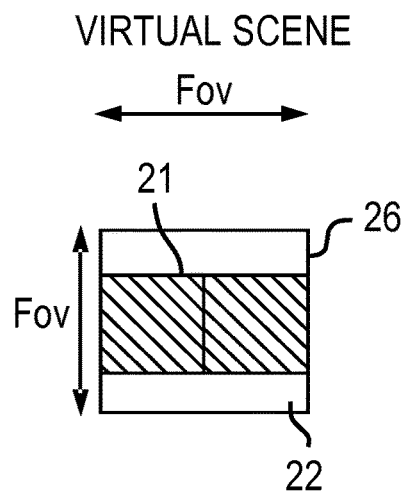

FIGS. 2A, 2B, 2C illustrate a virtual scene 22 from the perspective of the different points of view 24 of respective FIGS. 1A, 1B, 1C. The virtual scene 22 is determined by the point of view 24 within the virtual space 20 and a field of view 26. The virtual scene 22 is at least partially displayed to a user.

The virtual scenes 22 illustrated may be mediated reality scenes, virtual reality scenes or augmented reality scenes. A virtual reality scene displays a fully artificial virtual space 20. An augmented reality scene displays a partially artificial, partially real virtual space 20.

The mediated reality, augmented reality or virtual reality may be user interactive-mediated. In this case, user actions at least partially determine what happens within the virtual space 20. This may enable interaction with a virtual object 21 such as a visual element 28 within the virtual space 20.

The mediated reality, augmented reality or virtual reality may be perspective-mediated. In this case, user actions determine the point of view 24 within the virtual space 20, changing the virtual scene 22. For example, as illustrated in FIGS. 1A, 1B, 1C a position 23 of the point of view 24 within the virtual space 20 may be changed and/or a direction or orientation 25 of the point of view 24 within the virtual space 20 may be changed. If the virtual space 20 is three-dimensional, the position 23 of the point of view 24 has three degrees of freedom e.g. up/down, forward/back, left/right and the direction 25 of the point of view 24 within the virtual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

Figure 3A:
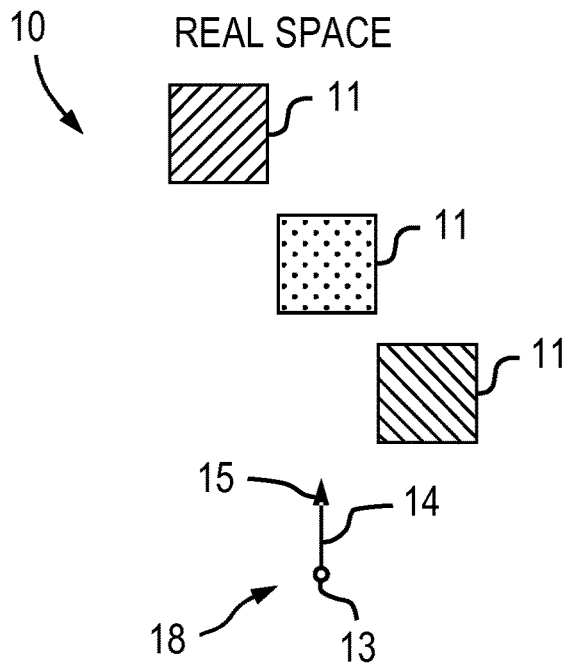
FIG. 3A illustrates an example of a real space and FIG. 3B illustrates an example of a real scene that partially corresponds with the virtual scene of FIG. 1B.

FIG. 3A illustrates a real space 10 comprising real objects 11 that at least partially corresponds with the virtual space 20 of FIG. 1A. In this example, each real object 11 in the real space 10 has a corresponding virtual object 21 in the virtual space 20, however, each virtual object 21 in the virtual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping exists between the real space 10 and the virtual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual space 20.

Figure 3B:
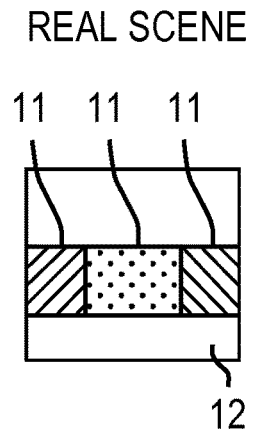

FIG. 3B illustrates a real scene 12 that partially corresponds with the virtual scene 22 of FIG. 1B, it includes real objects 11 but not artificial virtual objects. The real scene is from a perspective corresponding to the point of view 24 in the virtual space 20 of FIG. 1A. The real scene 12 content is determined by that corresponding point of view 24 and the field of view 26.

FIG. 2A may be an illustration of an augmented reality version of the real scene 12 illustrated in FIG. 3B. The virtual scene 22 comprises the real scene 12 of the real space 10 supplemented by one or more visual elements 28 displayed by an apparatus to a user. The visual elements 28 may be a computer-generated visual element. In a see-through arrangement, the virtual scene 22 comprises the actual real scene 12 which is seen through a display of the supplemental visual element(s) 28. In a see-video arrangement, the virtual scene 22 comprises a displayed real scene 12 and displayed supplemental visual element(s) 28. The displayed real scene 12 may be based on an image from a single point of view 24 or on multiple images from different points of view 24 at the same time, processed to generate an image from a single point of view 24.

FIG. 4A illustrates an apparatus 4 in the form of a chip or a chipset. The illustrated apparatus 4 comprises at least one processor 40 and at least one memory 46. The processor(s) 40 might be or include a central processing unit (CPU) and/or a graphics processing unit (GPU). The processor 40 is configured to read from and write to the memory 46. The processor 40 may also comprise an output interface via which data and/or commands are output by the processor 40 and an input interface via which data and/or commands are input to the processor 40.

The memory 46 stores a computer program 148 comprising computer program instructions (computer program code) 48 that controls the operation of the apparatus 4/30 when loaded into the processor 40. The computer program instructions 48, of the computer program 148, provide the logic and routines that enables the apparatus 4/30 to perform the methods illustrated in FIGS. 5, 6 and 8. The processor 40 by reading the memory 46 is able to load and execute the computer program 148.

The computer program 148 may arrive at the apparatus 4/30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 148. The delivery mechanism may be a signal configured to reliably transfer the computer program 148. The signal could, for example, be sent over a wireless connection (such as a radio frequency connection) or a wired connection in accordance with one or more protocols. The apparatus 4/30 may cause the computer program 148 to be transmitted as a computer data signal.

Although the memory 46 is illustrated as a single component/circuitry it may be implemented as one or more separate components/circuitry some or all of which may be integrated/removable and/or may provide permanent/semi-permanent/dynamic/cached storage.

Although the processor 40 is illustrated as a single component/circuitry it may be implemented as multiple processors, such as one or more separate components/circuitry some or all of which may be integrated/removable. The processor(s) 40 may be single core or multi-core.

FIG. 4B illustrates a schematic of an apparatus 30 that is operable to enable mediated reality and/or augmented reality and/or virtual reality.

In some embodiments, the apparatus 30 might be a single electronic device such as a head-mounted viewing device. An example of such a head-mounted viewing device is illustrated in FIG. 7B.

In other embodiments, the apparatus 30 could be distributed across multiple devices, which may be formed from a combination of a head-mounted viewing device, a games console/personal computer and/or one or more hand-held controllers. Where the apparatus 30 is formed at least in part by a games console or a personal computer, the processor 40 and the memory 46 (or, where multiple processors and/or multiple memories are provided, one or more of either or both) may be provided in the games console/personal computer.

In the illustrated example, the apparatus 30 comprises the apparatus 4 illustrated in FIG. 4A, one or more displays 32, one or more transceivers 42 and user input circuitry 44.

The one or more displays 32 are for providing at least parts of the virtual scene 22 to a user in a form that is perceived visually by the user. Such a virtual scene may form part of mediated reality content, such as virtual reality content or augmented reality content. The display(s) 32 may be one or more visual displays that provides light which displays at least parts of the virtual scene 22 to a user. Examples of visual displays include liquid crystal displays, organic light emitting displays, emissive, reflective, transmissive and transflective displays, direct retina projection display, near eye displays etc. The display(s) 32 is controlled in this example but not necessarily all examples by the processor 40.

A head-mounted viewing device moves when the head of the user moves. The head-mounted viewing device may be a see-through arrangement for augmented reality that enables a live real scene 12 to be viewed while one or more visual elements 28 are displayed by the display(s) 32 to the user to provide in combination the virtual scene 22. In this case a visor, if present, is transparent or semi-transparent so that the live real scene 12 can be viewed through the visor.

A head-mounted viewing device may be operated as a see-video arrangement for augmented reality that enables a live video of a real scene 12 to be displayed by the display(s) 32 for viewing by the user while one or more visual elements 28 are simultaneously displayed by the display(s) 32 for viewing by the user. The combination of the displayed real scene 12 and displayed one or more visual elements 28 provides the virtual scene 22 to the user. In this case the visor is opaque and may be used as the display(s) 32.

The one or more transceivers 42 are configured to receive inputs from the processor 40 to provide outputs to the processor 40. For example, the one or more transceivers 42 may receive data from the processor 40 and transmit it, and provide received data to the processor 40.

The one or more transceivers 42 may include one or more wireless transceivers and/or one or more wired transceivers. Such wireless transceivers may, for example, include radio frequency receivers in the form of one or more long range cellular transceivers or short range wireless transceivers (which, for example, may operate in accordance with an Institute of Electrical and Electronic Engineers wireless local area network 802.11 protocol or a Bluetooth protocol). Such wired transceivers may, for example, include a Universal Serial Bus (USB) transceiver.

In the illustrated example, the user input circuitry 44 may comprise one or more tactile sensors 43, one or more point of view sensors 45 one or more image sensors 47 for imaging real space 10 and one or more depth sensors 49.

The one or more tactile sensors 43 may include, for example, one or more joysticks and one or more keys/buttons. The joystick(s) and/or the key(s)/button(s) may form part of a physical, hand-held controller. If the apparatus 30 is head-mounted, at least some of the one or more tactile sensors 43 may be positioned on the head-mounted apparatus.

The apparatus 30 may enable user-interactive mediation for mediated reality and/or augmented reality and/or virtual reality. The user input circuitry 44 detects user actions using user input, such as via the tactile sensor(s) 43. These user actions are used by the processor 40 to determine what happens within the virtual space 20. This may enable interaction with a visual element 28 within the virtual space 20.

The apparatus 30 may enable perspective mediation for mediated reality and/or augmented reality and/or virtual reality. The user input circuitry 44 detects user actions. These user actions are used by the processor 40 to determine the point of view 24 within the virtual space 20, changing the virtual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the processor 40 to determine the point of view 24 within the virtual space 20, changing the virtual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation.

The apparatus 30 may comprise as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

The apparatus 30 may enable mediated reality and/or augmented reality and/or virtual reality, for example using the method 60 illustrated in FIG. 6A or a similar method. The processor 40 stores and maintains a model 50 of the virtual space 20. The model may be provided to the processor 40 or determined by the processor 40. For example, sensors in input circuitry 44 may be used to create overlapping depth maps of the virtual space from different points of view and a three dimensional model may then be produced.

At block 62 it is determined whether or not the model of the virtual space 20 has changed. If the model of the virtual space 20 has changed the method moves to block 66. If the model of the virtual space 20 has not changed the method moves to block 64.

At block 64 it is determined whether or not the point of view 24 in the virtual space 20 has changed. If the point of view 24 has changed the method moves to block 66. If the point of view 24 has not changed the method returns to block 62.

At block 66, a two-dimensional projection of the three-dimensional virtual space 20 is taken from the location 23 and in the direction 25 defined by the current point of view 24. The projection is then limited by the field of view 26 to produce the virtual scene 22. The method then returns to block 62.

Where the apparatus 30 enables augmented reality, the virtual space 20 comprises objects 11 from the real space 10 and also visual elements 28 not present in the real space 10. The combination of such visual elements 28 may be referred to as the artificial virtual space. FIG. 5B illustrates a method 70 for updating a model of the virtual space 20 for augmented reality.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differentiating and may be achieved at an object level using computer vision to track objects as they move.

At block 74 it is determined whether or not the artificial virtual space has changed. If the artificial virtual space has changed the method moves to block 76. If the artificial virtual space has not changed the method returns to block 72. As the artificial virtual space is generated by the controller 42 changes to the visual elements 28 are easily detected.

At block 76, the model of the virtual space 20 is updated.

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10. The communication circuitry 41 may form part of the transceiver(s) 42.

FIGS. 7A and 7B illustrate examples of apparatus 30 that enable display of at least parts of the virtual scene 22 to a user. Other examples of apparatus 30 that enable display of at least parts of the virtual scene 22 to a user may be used.

FIG. 7A illustrates a handheld apparatus 31 comprising a display screen as display 32 that displays images to a user and is used for displaying the virtual scene 22 to the user. The apparatus 30 may be moved deliberately in the hands of a user in one or more of the previously mentioned six degrees of freedom.

The handheld apparatus 31 may be or may be operated as a see-video arrangement for augmented reality that enables a live video of a real scene 12 to be displayed on the display 32 for viewing by the user while one or more visual elements 28 are simultaneously displayed on the display 32 for viewing by the user. The combination of the displayed real scene 12 and displayed one or more visual elements 28 provides the virtual scene 22 to the user.

If the handheld apparatus 31 has a camera mounted on a face opposite the display 32, it may be operated as a see-video arrangement that enables a live real scene 12 to be viewed while one or more visual elements 28 are displayed to the user to provide in combination the virtual scene 22.

FIG. 7B illustrates a head-mounted viewing device 33 comprising a display 32 that displays images to a user. The head-mounted apparatus 33 may be moved automatically when a head of the user moves.

The head-mounted viewing device 33 may be a see-through arrangement for augmented reality that enables a live real scene 12 to be viewed while one or more visual elements 28 are displayed by the display 32 to the user to provide in combination the virtual scene 22. In this case a visor 34, if present, is transparent or semi-transparent so that the live real scene 12 can be viewed through the visor 34.

The head-mounted viewing device 33 may be operated as a see-video arrangement for augmented reality that enables a live video of a real scene 12 to be displayed by the display 32 for viewing by the user while one or more visual elements 28 are simultaneously displayed by the display 32 for viewing by the user. The combination of the displayed real scene 12 and displayed one or more visual elements 28 provides the virtual scene 22 to the user. In this case a visor 34 is opaque and may be used as display 32.

Referring back to FIG. 4B, the apparatus 30 may enable user-interactive mediation for mediated reality and/or augmented reality and/or virtual reality. The user input circuitry 44 detects user actions from user input. These user actions are used by the processor 40 to determine what happens within the virtual space 20. This may enable interaction with a visual element 28 within the virtual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user moves. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body.

The tracking of one or more objects and/or points in relation to a user's body may be used by the apparatus 30 in gesture recognition and so on.

FIG. 8 illustrates a flow chart of a method according to embodiments of the invention. A description of the method follows, with reference to FIGS. 4A to 11.

In the example described below, the apparatus 30 comprises a head-mounted viewing device that enables a user to view recorded image content items 101-109 in mediated reality. Each of the image content items 101-109 is stereoscopic virtual reality content that contains a recording of one or more real scenes. Some or all of the image content items 101-109 may have been recorded by a camera of the apparatus 30. Alternatively or additionally, some or all of the image content items 101-109 may have been recorded elsewhere.

One or more of the image content items 101-109 may have been recorded at a time prior to it being retrieved from memory 46 and displayed on the display(s) 32. Alternatively or additionally, an image content item 101-109 may be recorded in memory 46 and displayed on the display(s) 32 at substantially the same time, providing a live video or a current (static) image of a real scene.

The image content items 101-109 are illustrated in FIG. 4B as being stored in the memory 46 of the apparatus 30. In some embodiments, some or all of the image content items 101-109 may be persistently stored in non-volatile memory of the apparatus 30. In other examples, some or all of the image content items 101-109 may only be transiently stored in the apparatus 30, such as in volatile memory. For instance, the image content items 101-109 may be persistently stored in a remote location (in the "cloud") transiently stored in the memory 46 of the apparatus 30 when the user chooses to retrieve them from the remote location for viewing on the apparatus 30.

FIG. 9 illustrates a recording 161 of a real scene that is provided when the processor 40 controls the display(s) 32 to display the first image content item 101. The recording 161 may form the whole or just part of the first image content item 101.

In this example, the recording 161 of the real scene is part of motion video content that is presented to the user in virtual reality. In order to display the recording 161 of the real scene, the processor 40 performs the method as described above in relation to FIG. 5. The recording 161 of the real scene includes images 132-135 of multiple real objects, including an image 131 of a television, an image 132 of a first ornament, an image 133 of a second ornament, an image 134 of a first picture frame in portrait configuration and an image 135 of a second picture frame in landscape configuration.

The recording 161 of the real scene is a virtual scene, like the virtual scene 22 described above in relation to FIGS. 2A, 2B and 2C. The recording 161 of the real scene has been formed by recording a real scene, like the real scene 12 described above in relation to FIG. 3B, using a stereoscopic mediated/virtual/augmented reality camera. The images 132-135 are virtual objects, like the virtual objects 21 described above in relation to FIGS. 1A to 2C, which were formed by recording real objects, like the real objects 11 described above in relation to FIG. 3A.

In this example, the processor 40 controls the display(s) 32 to highlight the images 131-135 of the real objects using the visual indications 141-145 illustrated in FIG. 9. The visual indications 141-145 may, for instance, indicate to the user that the images 131-135 are alterable by the user. It may be that images of real objects that do not have such a visual indication are not alterable by the user.

A user may provide user input to cause an alteration to be made to the recording 161 of the real scene in the first image content item 101. In block 801 in FIG. 8, the processor 40 responds to such user input by making an alteration to the recording 161 of the real scene.

FIG. 10 illustrates a user in the process of providing user input to select and alter the image 131 of the television in the recording 161 of the real scene. In this example, the user input that is provided to select and alter the image is a gesture in the form of a translation input. A translation input is a continuous displacement input which has a start location and an end location. A user may provide the input by placing a user input object (such as a hand or a digit) at the start location and moving the user input object to the end location.

FIG. 10 illustrates the start location 151 of the translation input that is provided by the user. The start location 151 is at or aligned with the image 131 of the television. For example, in order to align his hand with the image 131 of the television, a user may extend his arm towards the image 131 of the television. The processor 40 detects the start of the translation input from inputs provided to it by the user input circuitry 44 and interprets them as a selection of the image 131 of the television. In this example, when the processor 40 determines that the image 131 has been selected, the visual indications 142-145 are removed from display, but that need not necessarily be the case.

FIG. 11 illustrates the recording 161 of the real scene as the user completes the translation input. The user moves the user input object from the start location 151 to the end location 153 as illustrated by the arrow 152, which completes the translation input. As the user moves the user input object from the start location 151 to the end location 152, the processor 40 causes the image 131 of the television to move on the display(s) 32 as the user input object moves, so that it seems to the user as if the image 131 of the television is being dragged by the user input object. Movement of the image 131 of the television reveals a different image 136, which appears from beneath the image 131 of the television. The moving image 131 may then be removed from display by the processor 40.

In this example, the image 136 that appears from beneath the moving image 131 is also an image of a television. It may, for example, be an image 136 of a television that, at some point in time, has been positioned in the same location in real space as the television represented in the moving image 131. For example, it could be an older television or a newer television than the one depicted in the image 131 illustrated in FIG. 10. In this example, the replacement image 136 is an image of a real object of the same type (a television) as the real object depicted in the removed image 131.

In some circumstances, there may not be an appropriate replacement image 136. In such circumstances, the image 131 may not be replaced at all.

It may not be necessary for the replacement image 136 to be of a real object that is of the same type as the real object depicted in the removed image 131. Alternatively, the replacement image 136 could of a different type of real object that, at some point in time, was positioned in the same location in real space as the television represented in the removed image 131. Alternatively, the replacement image 136 might not be an image of any real object, indicating that the location was empty at some point in time.

The processor 40 may, for example, be configured to perform image processing on older and/or newer image content items than the first image content item 101 (or cause such image processing to be performed by an apparatus that is different from the apparatus 30, such as a remote server) in order to determine images of objects in those image content items that, at some point in time, have been positioned in the same real space locations as the images 131-135 of the objects in the recording 161 of the real scene. This image processing may take place prior to the user input being provided to alter the recording 161 of the real scene as illustrated in FIGS. 9 and 10, in order to avoid real time image processing having to be performed, enabling the processor 40 to exchange images of real objects for one another rapidly when appropriate user input is provided.

In some embodiments, images of objects that are positioned in the same real space locations as the objects in the recording 161 of the real scene may be stored as part of the first image content item 101, along with the recording 161 of the real scene. Alternatively, the first image content item 101, or metadata associated with it, may include one or more links to images of those objects in other image content items 102-109 (that could be stored in the memory 46 or remotely from the apparatus 30), which are retrieved in response to the user input provided by the user in block 801 of FIG. 8.

In some implementations, the processor 40 may enable the user to provide user inputs to make successive alterations to the recording 161 of the real scene by providing successive user inputs. For instance, if the user provides first user input, the processor 40 may cause the image 131 of the television to be replaced with the image 136 of the other television as described above. If the user provides second user input (for example, in the same direction), the processor 40 may cause the image 136 of the other television to be replaced with an image of another television (such as an even older television). The second user input might, for instance, be a translation input in the same direction as that described above in relation to FIGS. 10 and 11, with a start location at or aligned with the image 136 of the other television.

When a particular image content item is processed to determine whether it comprises one or more recordings of real scenes that include images of real objects in the same locations as the real objects in the recording 161 of the real scene illustrated in FIGS. 10 and 11, the processor 40 may also determine whether that image content item is older or newer than the image content item. This may enable the processor 40 to alter the recording 161 of the real scene by exchanging images of objects from a newer recording of the real scene or an older recording of the real scene depending on the user input provided.

For example, the processor 40 may respond to first user input (for instance, in a first direction) by replacing an image of a real object with an image from an older recording/image content item, and respond to second user input (for instance, in a second direction which might be opposite to the first direction direction) by replacing the image of a real object with an image from a newer recording/image content item.

In the context of the illustrated example, translation inputs in different directions may cause different images to replace the image of the real object. If the user provides a rightwards translation input (rather than the leftwards translation input illustrated in FIGS. 10 and 11), the processor 40 may cause the image 141 of the television to be replaced with a different image from the image 136 illustrated in FIG. 11, such as an image of a newer television.

It will be recognized by those skilled in the art that different forms of user input could be provided other than a translation input. For example, as described above, the user input could be provided using one or more tactile sensors 43, which could form part of a hand-held controller.

In block 802 in FIG. 8, the processor 40 determines an altered characteristic of the recording 161 of the real scene. In this example, the altered characteristic could be a time period during which the (original) recording comprising the image 136 of the television was captured.

In block 803 in FIG. 8, the processor 40 determines whether one or more other image content items 102-109, different from the first image content item 101, have a recording of a real scene which comprises the determined altered characteristic. As explained above, in this example the altered determined characteristic is the time period during which the (original) recording comprising the image 136 of the television was captured, so the processor 40 searches through one or more other image content items 102-109, different from the first image content item 101, to determine whether any of them have a recording of a real scene that was captured during that time period. This could be done by, for example, analyzing a date stamp of each of the image content items 102-109 which may be provided in metadata.

In block 804 in FIG. 8, after determining one or more image content items that comprise the altered characteristic in block 803 in FIG. 8, the processor 40 causes that/those image content items to be indicated to the user. It may, for example, cause images representing one or more of them to be displayed by the display(s) 32. At least one of the image content items may be different from the image content that the image 136 of the older television (illustrated in FIG. 11) was taken from when altering the recording 161 of the real scene.

In some embodiments, the processor 40 might also cause image content items that do not comprise the altered characteristic to be displayed by the display(s) 32 (such as those with a date of creation outside the determined time period), but might cause image content items that comprise the altered characteristic to be displayed more prominently (for example, at the top of a list).

FIG. 12 illustrates an example in which the processor 40 determined that the second, third and fourth image content items 102-104 each comprise a recording of a real scene that was captured during the determined time period. The processor 40 causes each of the second, third and fourth image content items 102-104 to be represented on the display(s) 32 in this example with a thumbnail image of the recording of the real scene which was captured during that time period. The image 136 of the real object that provided the "seed" for the search is also displayed.

In the example illustrated in FIG. 12, the processor 40 has also determined that the second image content item 102 includes a recording of a real scene comprising the image 136 of the television that was revealed in FIG. 11 and, as a consequence, has displayed an image 162 representing the second image content item 102 more prominently than the images 163, 164 representing the third and fourth image content items 103, 104. Alternatively, the most prominent position might be occupied by an image of the most frequently accessed/played image content item.

The altered characteristic need not be a time period during which the (original) recording comprising the image 136 of the television was captured, as described above in relation to block 802 in FIG. 8. It could instead be the presence of the image 136 of the older television (which replaces the image 131 of the television illustrated in FIGS. 9 and 10), for instance. If so, in block 803 in FIG. 8, the processor 40 determines that one or more other image content items 102-109, different from the first image content item 101, have a recording of a real scene that includes an image of the older television.

In some implementations, in order to determine this, the processor 40 may perform image processing on image content items 102-109, which could be stored persistently in the memory 46 of the apparatus 30 or in a remote location. In the latter case, the processor 40 may cause the transceiver(s) 42 to the download image content items 102-109 and store them (persistently or transiently) for processing by the processor 40. Additionally or alternatively, the processor 40 may cause such image processing to be performed by an apparatus that is different from the apparatus 30, such as a remote server.

In block 804 in FIG. 8, the processor 40 then causes one or more image content items to be indicated to the user which include an image 136 of the older television in the manner described above.

FIG. 13 illustrates a recording 165 of a real scene that is provided when the processor 40 controls the display(s) 32 to display the fifth image content item 105. The recording 165 may form the whole or just part of the first image content item 105.

In this example, the recording 161 of the real scene is part of motion video content that is presented to the user in virtual reality. In order to display the recording 165 of the real scene, the processor 40 performs the method as described above in relation to FIG. 5. The recording 165 of the real scene includes images of multiple real objects, including an image 137 of a television.

The recording 165 of the real scene is a virtual scene, like the virtual scene 22 described above in relation to FIGS. 2A, 2B and 2C. The recording 165 of the real scene has been formed by recording a real scene, like the real scene 12 described above in relation to FIG. 3B, using a stereoscopic mediated/virtual/augmented reality camera. The images of the real world objects are virtual objects, like the virtual objects 21 described above in relation to FIGS. 1A to 2C, which were formed by recording real objects, like the real objects 11 described above in relation to FIG. 3A.

As described above in relation to the previous example, the processor 40 might control the display(s) 32 to highlight any images of real objects that are alterable by the user. It may be that images of real objects that do not have such a visual indication are not alterable by the user.

The processor 40 again performs the method illustrated in FIG. 8 in this example. However, in this example, the user may alter a characteristic of the recording 165 of the real scene by moving at least one image of a real object in the recording 165 to a different location in the recording 165.

A user may provide user input to select an image of a real object to move in the recording 165 of the real scene. Prior to, during or after selection of such an image, the processor 40 may cause one or more visual indications to be displayed to the user, in the recording 165 of the real scene, indicating at least one potential location to which the image may be moved to.

The potential locations of the image 137 of the television/real object may be determined by processing image content items before, during or after any user input is provided by the user to determine whether an image 137 of the television/real world object is present in a recording of the real scene in those image content items and, if so, the location of the image of the television/real object.

Such a situation is illustrated in FIG. 14, where the processor 40 has caused the display(s) 32 to display multiple visual indications 172, 173 that indicate potential locations to which the image 137 of the television may be moved to.

Each of the locations indicated by the visual indications 172, 173 may correspond with the location of an image of the same real object (in this case, the television) in a further recording of the real scene in another image content item.

In block 801 in FIG. 8, the processor 40 responds to user input by making an alteration to the recording 165 of the real scene. The alteration is made by moving the (whole of the) image 137 of the television to a different location in the recording 165. The user input that is provided to cause the image 137 of the television to move may be a translation input of the form described above, which has a start location at or aligned with the image 137 and an end location at or aligned with the location to which the image 137 is moved.

In block 802 in FIG. 8, the processor 40 determines an altered characteristic of the recording 165 of the real scene. In this example, the altered characteristic is the new location of the image 137 of the television.

In block 803 in FIG. 8, the processor 40 determines that one or more other image content items, different from the fifth image content item 105, have a recording of a real scene which comprises the determined altered characteristic.

In block 804, the processor 40 then causes one or more image content items to be indicated to the user which include an image of the television/real object in the new location in a recording of the real scene.

The upper left hand side of FIG. 15 illustrates the recording 165 of the real scene illustrated in FIGS. 13 and 14 prior to any alteration being made to the recording 165 of the real scene. Beneath that, in this example, the processor 40 has caused the display(s) 32 to display images 166, 167 of recordings of the real scene provided in sixth and seventh image content items 106, 107 that include the image 137 of the television/real object in its original location.

The right hand side of FIG. 15 illustrates the recording 165 of the real scene illustrated in FIGS. 13 and 14 after the recording 165 of the real scene has been altered by moving the position of the image 137 of the television to that indicated by the visual indication labelled with the reference numeral 172. Beneath that, in this example, the processor 40 has caused the display(s) 32 to display images 168, 169 of recordings of the real scene provided in eighth and ninth image content times 108, 109 that include the image 137 of the television/real object in its altered location.

Embodiments of the invention are not limited to the alteration of the recording of real scenes in the manner described above. For example, in some embodiments of the invention, a size of an image of a real object might be altered, which causes the processor 40 to control the display(s) 32 to indicate one or more image content items to the user which include an image of the real object with the altered size.

In these embodiments, the real object could be a person. Altering the size of the image of the person may cause the processor 40 to search for image content items which include an image of the person where the person is smaller/younger or taller/older.

In order to do this, the processor 40 may determine a real size of the real object/person shown in the original recording. This could be done, for example, by using metadata associated with an image content item which might indicate, for example, optical properties of the camera used to capture the relevant recording and the distance of the real object/person from the capturing device when the recording was captured.

The processor 40 may then use the determined real size of the real object/person to determine a real size which corresponds with the altered size of the image of the real object/person, and compare that with determined real sizes of images of the real object/person in recordings of real scenes in other image content items.

In summary, embodiments of the invention provide a particularly efficient and intuitive way of enabling a user to search through image content items, where images of real objects effectively serve as content indices/links to other image content items.

A user may, for example, be able to find image content items easily that were captured in the same location and/or in the same time period as another image content item without having to recall exactly when the earlier image content items were captured and/or exactly where they are stored.

For example, a user may be able to recollect that a particular image content item was recorded when he owned his old television, but not recall exactly where it is stored. Embodiments of the present invention can help him to perform a search to find it in a intuitive way.

References to 'computer-readable storage medium', or a 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in FIGS. 5, 6 and 8 may represent steps in a method and/or sections of code in the computer program 148. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Although embodiments of the present invention have been described in the preceding paragraphs with reference to various examples, it should be appreciated that modifications to the examples given can be made without departing from the scope of the invention as claimed. For example, while the image content items are described above as stereoscopic virtual reality content items that are viewed using a head-mounted viewing device, this need not necessarily be the case.

In some implementations, the image content items might be instead be stereoscopic augmented reality content items and in other implementations the image content items might not be stereoscopic.

There may be different ways of making alterations to a recording of a real scene other than those described above. For example, details could be added or removed from images of real objects (such as adding or removing glasses to/from a person) or colors of images of real objects could be changed.

In some implementations, more than one alteration may be made to a recording of a real scene.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:
1. A method, comprising:
responding to user input by making at least one alteration to a recording of a real scene in a first image content item;
determining at least one altered characteristic of the recording of the real scene;
determining that one or more further image content items, different from the first image content item, have a recording of a real scene comprising the at least one determined altered characteristic; and
causing at least one further image content item, having a recording of a real scene comprising the at least one determined altered characteristic, to be indicated to a user.

2. The method of claim 1, wherein the first image content item is stereoscopic mediated reality content, and the further image content items are stereoscopic mediated reality content items.

3. The method of claim 1, further comprising: causing a visual indication to be provided to a user indicating that an image of a real object in the recording of the real scene is alterable, prior to the user input being provided.

4. The method of claim 1, wherein determining that one or more further image content items have a recording of a real scene comprising the at least one determined altered characteristic comprises determining dates of creation of the further image content items.

5. The method of claim 1, wherein making the alteration to the recording of a real scene comprises altering a location of an image of a real object in the recording of the real scene by moving the whole of the image of the real object from a first location to a second location.

6. The method of claim 5, further comprising: causing one or more visual indications to be displayed to a user, in the recording of the real scene, indicating at least one potential location to which the image of the real object is movable, wherein the at least one potential location to which the image of the real object is movable corresponds with a location of an image of the real object in a further recording of the real scene in at least one of the further image content items.

7. The method of claim 1, wherein making the alteration to the recording of the real scene comprises altering a size of an image of a real object.

8. The method of claim 7, further comprising: determining a real size of the real object; determining a real size corresponding with the altered size of the image of the real object, based on the determined real size and the user input provided to alter the size of the image of the real object, wherein determining whether one or more further image content items, different from the first image content item, have a recording of a real scene comprising the determined altered characteristic comprises comparing determined real sizes of real objects with the real size corresponding with the altered size of the image of the real object.

9. The method of claim 8, wherein the image of the real object in the first image content item is a person.

10. The method of claim 1, wherein making the alteration to the recording of the real scene comprises exchanging an image of a real object with a different image of a real object of the same type.

11. An apparatus comprising at least one processor and at least one memory, the memory comprising machine-readable instructions, that when executed cause the apparatus to:
respond to user input by making at least one alteration to a recording of a real scene in a first image content item;
determine at least one altered characteristic of the recording of the real scene;
determine that one or more further image content items, different from the first image content item, have a recording of a real scene comprising the at least one determined altered characteristic; and
cause at least one further image content item, having a recording of a real scene comprising the at least one determined altered characteristic, to be indicated to a user.

12. The apparatus of claim 11, wherein the first image content item is stereoscopic mediated reality content, and the further image content items are stereoscopic mediated reality content items.

13. The apparatus of claim 11, further caused to: cause a visual indication to be provided to a user indicating that an image of a real object in the recording of the real scene is alterable, prior to the user input being provided.

14. The apparatus of claim 11, wherein determining that one or more further image content items have a recording of a real scene comprising the at least one determined altered characteristic comprises determining dates of creation of the further image content items.

15. The apparatus of claim 11, wherein making the alteration to the recording of a real scene comprises altering a location of an image of a real object in the recording of the real scene by moving the whole of the image of the real object from a first location to a second location.

16. The apparatus of claim 15, further caused to: cause one or more visual indications to be displayed to a user, in the recording of the real scene, indicating at least one potential location to which the image of the real object is movable, wherein the at least one potential location to which the image of the real object is movable corresponds with a location of an image of the real object in a further recording of the real scene in at least one of the further image content items.

17. The apparatus of claim 11, wherein making the alteration to the recording of the real scene comprises altering a size of an image of a real object.

18. The apparatus of claim 17, further caused to: determine a real size of the real object; determining a real size corresponding with the altered size of the image of the real object, based on the determined real size and the user input provided to alter the size of the image of the real object, wherein determining whether one or more further image content items, different from the first image content item, have a recording of a real scene comprising the determined altered characteristic comprises comparing determined real sizes of real objects with the real size corresponding with the altered size of the image of the real object.

19. The apparatus of claim 11, wherein making the alteration to the recording of the real scene comprises exchanging an image of a real object with a different image of a real object of the same type.

20. At least one non-transitory computer readable medium comprising instructions that, when executed, perform:
respond to user input by making at least one alteration to a recording of a real scene in a first image content item;
determine at least one altered characteristic of the recording of the real scene;
determine that one or more further image content items, different from the first image content item, have a recording of a real scene comprising the at least one determined altered characteristic; and
cause at least one further image content item, having a recording of a real scene comprising the at least one determined altered characteristic, to be indicated to a user.

* * * * *